(12) United States Patent
Eduri

(10) Patent No.: US 7,606,236 B2
(45) Date of Patent: Oct. 20, 2009

(54) FORWARDING INFORMATION BASE LOOKUP METHOD

(75) Inventor: Eswar M. Eduri, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1038 days.

(21) Appl. No.: 10/850,937

(22) Filed: May 21, 2004

(65) Prior Publication Data

US 2005/0259672 A1    Nov. 24, 2005

(51) Int. Cl.
H04L 12/56 (2006.01)
(52) U.S. Cl. .................... 370/395.32; 718/107
(58) Field of Classification Search ........... 370/225, 370/352, 389, 230.1, 395, 428, 395.32; 718/104, 718/107; 711/154; 712/19; 379/201
See application file for complete search history.

(56) References Cited

U.S. PATENT DOCUMENTS

| | | | | |
|---|---|---|---|---|
| 5,526,352 | A * | 6/1996 | Min et al. ............ | 370/395.4 |
| 6,144,983 | A * | 11/2000 | Klots et al. ........... | 718/104 |
| 6,526,451 | B2 * | 2/2003 | Kasper ............... | 709/250 |
| 6,539,488 | B1 * | 3/2003 | Tota et al. ............ | 713/400 |
| 6,717,910 | B1 * | 4/2004 | Kasper et al. ........ | 370/229 |
| 6,914,883 | B2 * | 7/2005 | Dharanikota ......... | 370/230.1 |
| 7,035,323 | B1 * | 4/2006 | Arato et al. .......... | 375/222 |
| 7,039,915 | B2 * | 5/2006 | Kavoori et al. ....... | 718/104 |
| 7,100,021 | B1 * | 8/2006 | Marshall et al. ...... | 712/19 |
| 7,206,309 | B2 * | 4/2007 | Pegrum et al. ....... | 370/389 |
| 7,342,874 | B2 * | 3/2008 | Pegrum et al. ....... | 370/218 |
| 7,415,028 | B1 * | 8/2008 | Allam ................ | 370/395.54 |

(Continued)

FOREIGN PATENT DOCUMENTS

WO    WO 03081451 A1 * 10/2003

OTHER PUBLICATIONS

Sender-initiated multicast forwarding scheme; Visoottiviseth, V.; Kido, H.; Iida, K.; Kadobayashi, Y.; Yamaguchi, S.; Telecommunications, 2003. ICT 2003. 10th International Conference on vol. 1, Feb. 23-Mar. 1, 2003 pp. 334-339 vol. 1.*
PCT/US05/008613, Mar. 14, 2005.*

Primary Examiner—Edan Orgad
Assistant Examiner—Salman Ahmed
(74) Attorney, Agent, or Firm—Blakely, Sokoloff, Taylor & Zafman LLP

(57) ABSTRACT

A method and apparatus for improving forwarding information base (FIB) lookup performance. An FIB is partitioned into a multiple portions that are distributed across segments of a multi-channel SRAM store to form a distributed FIB that is accessible to a network processor. Primary entries corresponding to a linked list of FIB entries are stored in a designated FIB portion. Secondary FIB entries are stored in other FIB portions (a portion of the secondary FIB entries may also be stored in the designated primary entry portion), enabling multiple FIB entries to be concurrently accessed via respective channels. A portion of the secondary FIB entries may also be stored in a secondary (e.g., DRAM) store. A depth level threshold is set to limit the number of accesses to a linked list of FIB entries by a network processor micro-engine thread, wherein an access depth that would exceed the threshold generates an exception that is handled by a separate execution thread to maintain line-rate throughput.

27 Claims, 15 Drawing Sheets

U.S. PATENT DOCUMENTS

| | | | |
|---|---|---|---|
| 7,424,014 B2* | 9/2008 | Mattes et al. | 370/389 |
| 7,430,238 B2* | 9/2008 | Lin et al. | 375/240.16 |
| 7,515,588 B2* | 4/2009 | Naik et al. | 370/392 |
| 2002/0126671 A1* | 9/2002 | Ellis et al. | 370/390 |
| 2002/0141429 A1* | 10/2002 | Pegrum et al. | 370/422 |
| 2003/0198182 A1* | 10/2003 | Pegrum et al. | 370/225 |
| 2003/0235195 A1* | 12/2003 | Shenoy et al. | 370/389 |
| 2004/0160958 A1* | 8/2004 | Oh | 370/395.1 |
| 2005/0021752 A1* | 1/2005 | Marimuthu et al. | 709/225 |
| 2005/0074001 A1* | 4/2005 | Mattes et al. | 370/389 |
| 2005/0135379 A1* | 6/2005 | Callaway et al. | 370/395.31 |
| 2005/0207409 A1* | 9/2005 | Naik et al. | 370/389 |
| 2006/0098630 A1* | 5/2006 | Berg | 370/352 |
| 2006/0129767 A1* | 6/2006 | Berenyi et al. | 711/154 |
| 2006/0212633 A1* | 9/2006 | Kasper | 710/260 |
| 2007/0124733 A1* | 5/2007 | Bril et al. | 718/104 |
| 2007/0165815 A1* | 7/2007 | Shaffer et al. | 379/201.01 |
| 2008/0084880 A1* | 4/2008 | Dharwadkar | 370/392 |

* cited by examiner

FORWARDING INFORMATION BASE LOOKUP METHOD

FIELD OF THE INVENTION

The field of invention relates generally to network processing and, more specifically but not exclusively relates to techniques for improving forwarding information base lookup performance to support very-high line rates, such as OC192.

BACKGROUND INFORMATION

One of the most important considerations for handling network traffic is packet throughput. Network processors and the like are designed to efficiently process very large numbers of packets per second. In order to process a packet, the network processor (and/or network equipment employing the network processor) needs to extract data from the packet header indicating the destination of the packet, class of service, etc., store the payload data in memory, perform various overhead functions, enqueue and dequeue the payload data, etc.

In general, the amount of time it takes to process a packet is much greater than the line-rate at which packets are received. For example, the OC192 line rate corresponds to a 10 Gigabit/second throughput. If the average packet size is 49 bytes, this corresponds to a packet receive rate of approximately 25 million packets/second, or one packet every 40 nanoseconds. Meanwhile, packet processing typically takes several thousand processor cycles to perform. For instance, a high-performance network processor running at 1.4 GHz that requires 3000 cycles per packet would take 2142 nanoseconds to process each packet.

In order to maintain line-rate throughput levels, packet-processing operations need to be performed in a predictable manner. A typical scheme employs various mechanisms for "hiding" processing latencies. For example, if approximately the same number of cycles are used to processes each packet, the specific amount of processing latency is somewhat immaterial—the processing latency just appears as a delay, but does not reduce the line-rate throughput. In contrast, if substantially different amounts of processing latency are encountered, the throughput will fall below line-rate unless some mechanism is employed to handle packets with longer processing latencies. Under a typical scenario, line-rate throughput is maintained by simply dropping significant numbers of packets. This is highly undesirable, and clearly reduces the "real" throughput of the network.

Among other operations, the foregoing packet processing operations require multiple memory accesses. One or (generally) more of these memory accesses relate to determining the "next hop" for the packet. The next hop represents the next network element (e.g., router, switch, etc.) to which the packet is to be forwarded. Typically, a forwarding information base (FIB) or the like is used to determine the next hop based on the destination address (and possibly other information) for the packet. To speed up this process, various indexing schemes are used. However, the amount of latency encountered during the performance of conventional indexing schemes is not predictable under many circumstances.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6a is a schematic diagram of a detailed implementation of the FIB entry scheme of FIG. 5a;

FIG. 6b shows an addition of a new entry to the FIB entry configuration of FIG. 6a;

DETAILED DESCRIPTION

Figure 1:
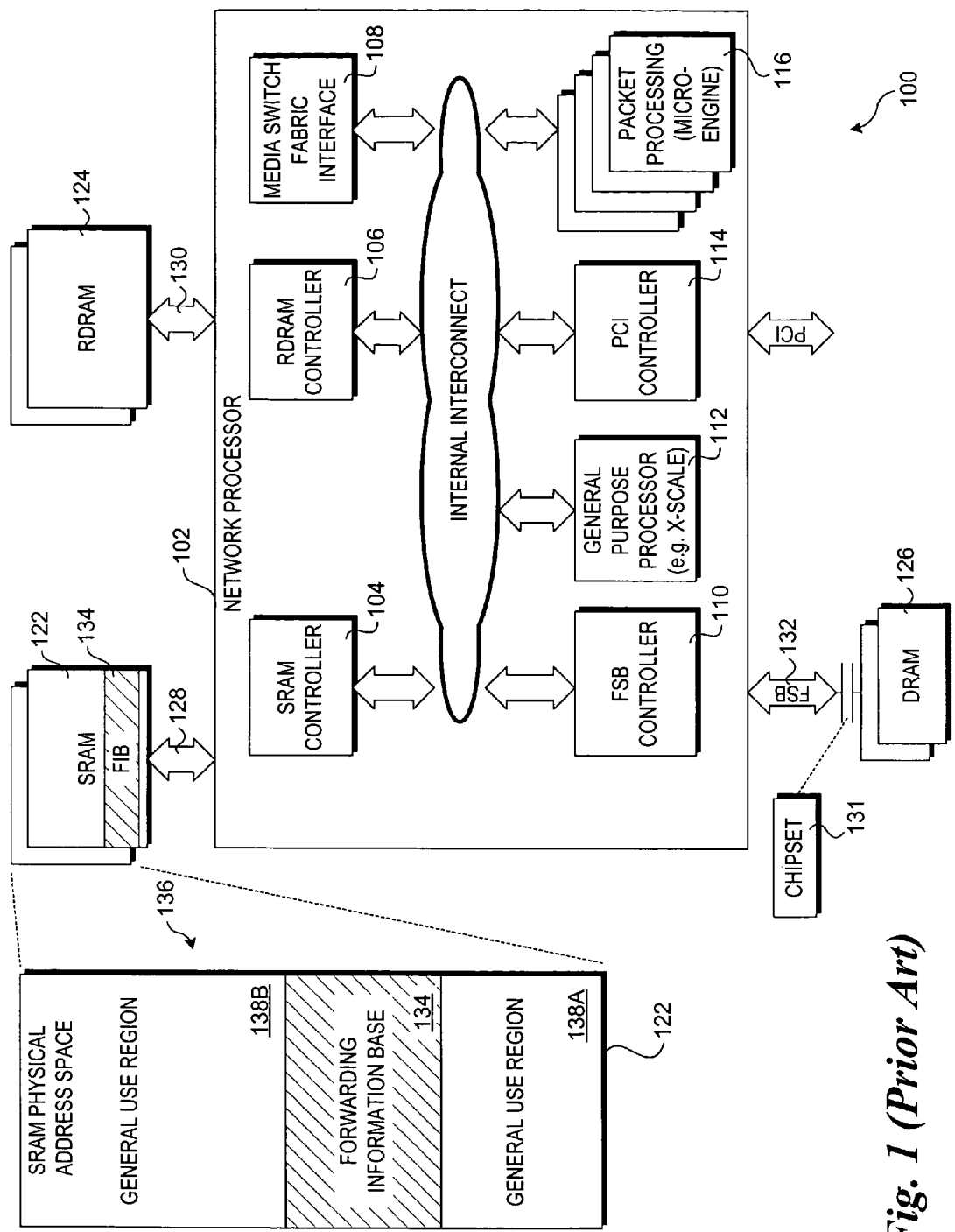
FIG. 1 is a schematic diagram of a network device architecture illustrating a conventional scheme for implementing a forwarding information base (FIB) in a static random access memory (SRAM) store.

Embodiments of methods and apparatus for improving forwarding information base (FIB) lookup performance at high data rates are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The embodiments described below relate to techniques for improving FIB lookup performance. In connection with the techniques are various schemes for accessing and storing data using hash-based indexes and the like in memory managed by network processors and the like. In order to better understand and appreciate aspects of the embodiments, a brief description of the types of memory generally employed by network processors now follows.

Ideally, all memory accesses would be via the fastest scheme possible. For example, modern on-chip (i.e., on the processor die) static random access memory (SRAM) provides access speeds of 10 nanoseconds or less. However, this type of memory is very expensive (in terms of chip real estate and chip yield), so the amount of on-chip SRAM memory is typically very small. Typical modern network processors employ a small amount of on-chip SRAM for scratch memory and the like.

The next fastest type of memory is off-chip SRAM. Since this memory is off-chip, it is slower to access, since it must be accessed via an interface between the network processor and the SRAM. Thus, a special memory bus is required for fast access. In some designs, a dedicated back-side bus (BSB) is employed for this purpose. Off-chip SRAM is generally used by modern network processors for storing and processing packet metadata, along with storing other processing-related information.

Typically, various types of off-chip dynamic RAM (DRAM) are employed for use as "bulk" memory. Dynamic RAM is slower than static RAM (due to physical differences in the design and operation of DRAM and SRAM cells), and must be refreshed every few clock cycles, taking up additional overhead. As before, since it is off-chip, it also requires a special bus to access it. In most of today's designs, a bus such as a front-side bus (FSB) is used to enable data transfers between banks of DRAM and a processor. Under a typical design, the FSB connects the processor to a memory control unit in a platform chipset (e.g., memory controller hub (MCH)), while the chipset is connected to memory store, such as DRAM, RDRAM (Rambus DRAM) or DDR DRAM (double data rate), etc. via dedicated signals. As used herein, a memory store comprises one or more memory storage devices having memory spaces that are managed as a common memory space.

FIG. 1 shows an overview of a conventional network device architecture 100 that supports the use of various types of memory stores. At the heart of the architecture is a network processor 102. The network processor includes an SRAM controller 104, a Rambus DRAM (RDRAM) controller 106, a media switch fabric interface 108, an FSB controller 110, a general-purpose processor 112, a peripheral component interconnect (PCI) controller 114, and a plurality of packet processing micro-engines 116. Each of the foregoing components are interconnected via an internal interconnect 118, which represents an appropriate set of address and data buses and control lines (a.k.a., command bus) to support communication between the components.

Network device architecture 100 depicts several memory stores. These include one or more banks of SRAM 122, one or more banks of RDRAM 124, and one or more banks of DRAM 126. In one embodiment, SRAM 122 is connected to network processor 102 (and internally to SRAM controller 104) via a high-speed SRAM interface 128. In one embodiment, RDRAM 124 is connected to network processor 102 (and internally to RDRAM controller 106) via a high-speed RDRAM interface 130. In one embodiment, DRAM 126 is connected to a chipset 131, which, in turn, is connected to network processor 102 (and internally to FSB controller 110) via a front-side bus 132 and FSB interface.

As depicted herein, RDRAM-related components are illustrative of various components used to support different types of DRAM-based memory stores. These include, but are not limited to RDRAM, RLDRAM (reduced latency DRAM), DDR, DDR-2, DDR-3, and FCDRAM (fast cycle DRAM).

One of the primary functions performed during packet processing is determining the next hop to which the packet is to be forwarded. A typical network device, such as a switch, includes multiple input and output ports. More accurately, the switch includes multiple input/output (I/O) ports, each of which may function as either an input or an output port within the context of forwarding a given packet. An incoming packet is received at a given I/O port (that functions as in input port), the packet is processed, and the packet is forwarded to its next hop via an appropriate I/O port (that functions as an output port). The switch includes a plurality of cross-connects known as the media switch fabric. The switch fabric connects each I/O port to the other I/O ports. Thus, a switch is enabled to route a packet received at a given I/O port to any of the next hops coupled to the other I/O ports for the switch.

Figure 2:
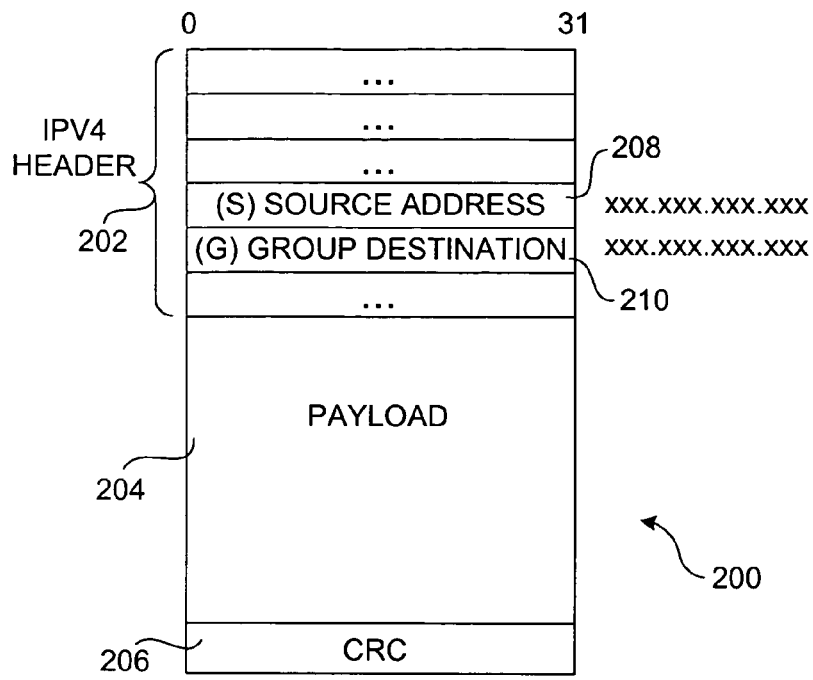
FIG. 2 is schematic diagram of an IPv4 (Internet Protocol, version 4) packet.

Each packet contains routing information in its header. For example, a conventional IPv4 (Internet Protocol version 4) packet 200 is shown in FIG. 2. The packet data structure includes a header 202, a payload 204, and an optional footer 206. The packet header comprises 5-15 32-bit rows, wherein optional rows occupy rows 6-15. The packet header contains various information for processing the packet, including a source (S) address 208 (i.e., the network address of the network node from which the packet originated) that occupies the fourth row. The packet also includes a destination address, which represents the network address to which the packet is to be forwarded to, and occupies the fifth row; in the illustrated example, a group (G) destination address 210 corresponding to a multicast forwarding process is shown. In addition to the source and destination addresses, the packet header also includes information such as the type of service, packet length, identification, protocol, options, etc.

The payload 204 contains the data that is to be delivered via the packet. The length of the payload is variable. The optional footer may contain various types of information, such as a cyclic redundancy check (CRC), which is used to verify the contents of a received packet have not been modified.

Each switch maintains a routing table that contains information for routing packets to various nodes in the network. Routing tables are used for determining the "best" next hop for forwarding a given packet to its destination node, and, as such, are sometimes referred to as forwarding tables. The destination node may be one of the next hops available to the switch (rare) or a node that is one or more hops downstream from one or more of the next hops available to the switch (more common). Under one well-known scheme, the routing table enables an appropriate next hop to be determined using a prefix-based scheme, such as longest pre-fix match. In most networks, routing tables are dynamically updated to reflect changes in network topology. In more advanced switches, routing table information may also reflect current traffic considerations.

In order to speed up route determination, information mirroring a portion (generally) of the routing data in the routing tables is maintained in a forwarding information base (FIB). In general, the FIB will employ some type of mechanism to facilitate increased lookup speeds. These mechanisms typically are facilitated through some type of hashing scheme and/or trie tables.

Figure 3:
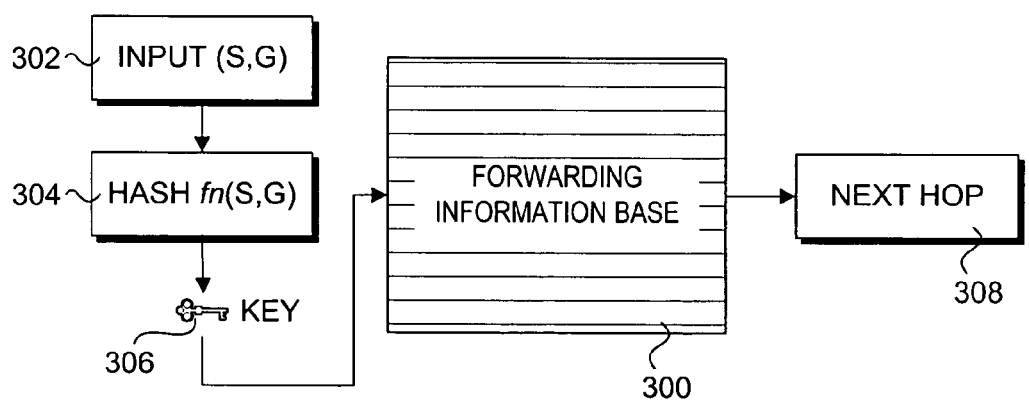
FIG. 3 is a flow diagram illustrating an FIB indexing scheme using a hash function that operates on source and group destination address inputs.

For example, an overview of a hash-based FIB scheme is shown in FIG. 3. The forwarding information is maintained in FIB 300. Based on a given input, it is desired to locate the appropriate next hop as quickly as possible. In the case of multicast forwarding, the input information in the illustrated example includes the source address S and the group destination address G, as depicted by an input block 302. A hash is then performed on a function of these inputs (e.g., a concatenation) using one or more hash functions 304 to produce a key 306. The key is then used as an index to a table in FIB 300. Using the key as the index input, an appropriate FIB entry is identified containing the next hop information 308. This next hop information is then extracted to determine the appropriate I/O port via which the packet is to be forwarded.

Under a typical conventional approach, an FIB is maintained in a local SRAM store. For example, FIG. 1 shows an FIB 134 that is stored in SRAM store 122. Further details of an exemplary partitioning of the physical address space of SRAM 122 including FIB 134 is shown toward the left-hand side of FIG. 1. The one or more banks of SRAM are logically configured as an SRAM physical address space 136 spanning a base address to a top address, which will generally be equal to the base address plus the size of the address space. The particular base address value is unimportant. As depicted in FIG. 1, the SRAM physical address space is divided into two different types of regions, including general use regions 138A and 138B and FIB 134. Overall, the general use regions 136A and 136B are used in the same manner as conventional SRAM usage as pertains to network processor operation. That is, the general use regions function as "normal" SRAM, and may be used to store various data based on the needs of the network processor.

One problem that is common to hash-based FIB schemes is that of "collisions". Collisions occur whenever multiple FIB entries are mapped to the same hash key. As a result of collisions, it is often necessary to perform a sequence of FIB entry lookups in order to retrieve the appropriate FIB entry for a given packet. This may consume excessive processing latency.

In accordance with one embodiment, the foregoing processing latency is reduced by distributing an FIB into multiple portions, wherein each portion is accessed via a respective memory channel. Under one technique, respective threads operating on one or more micro-engines are employed for accessing FIB entries in the respective FIB portions. Since the threads are executed concurrently, the total processing latency is reduced.

Figure 4:
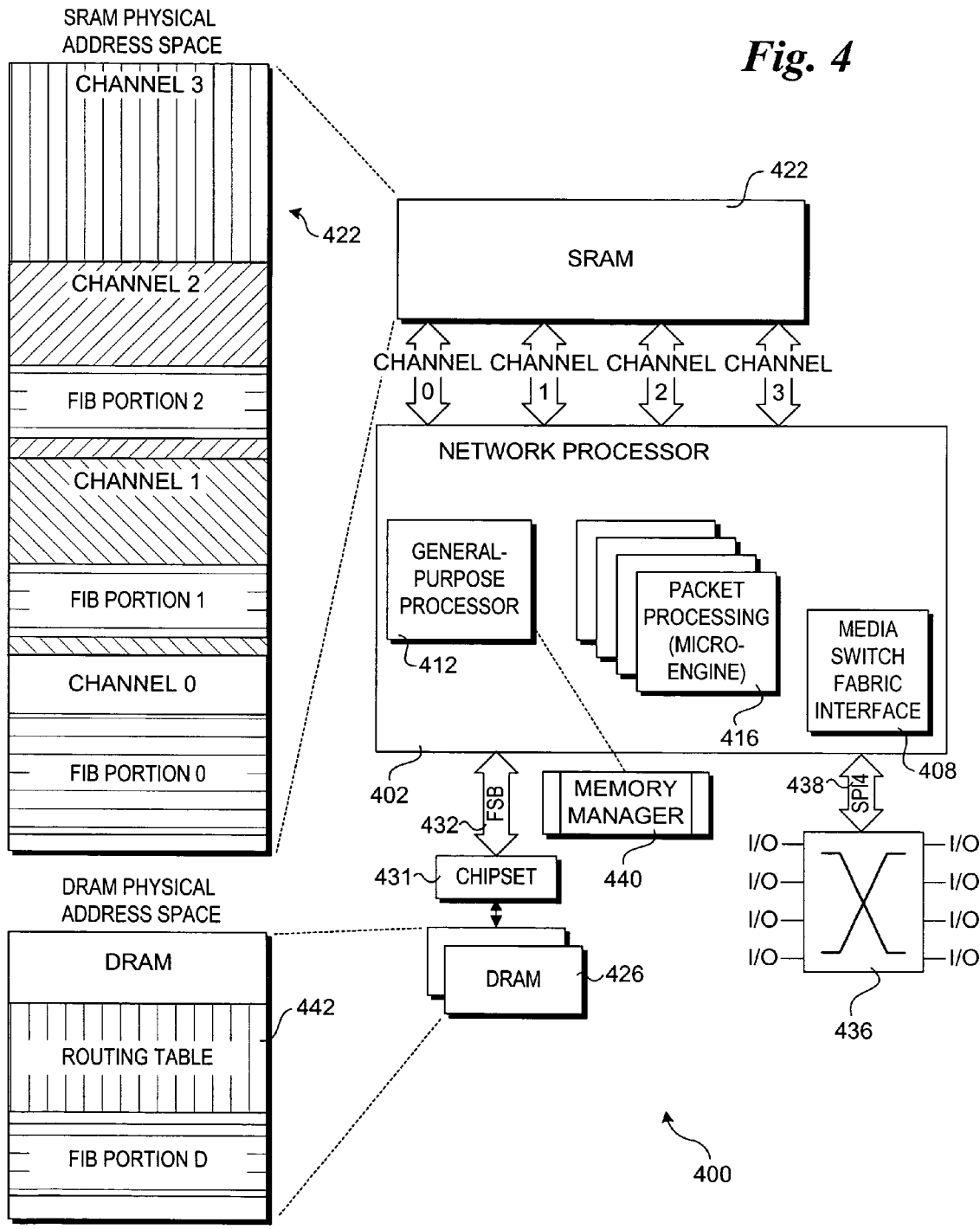
FIG. 4 is a schematic diagram of network device architecture including a distributed FIB implemented via a multi-channel SRAM store, according to one embodiment of the invention.

An exemplary FIB distribution scheme corresponding to one embodiment in which four-channel access is provided to an SRAM store is shown in FIG. 4. FIG. 4 shows a network device architecture 400 including a network processor 402 coupled to a multi-channel SRAM store 422 via channels 0, 1, 2, and 3. Many aspects of network processor 402 are analogous to those shown for network processor 102 in FIG. 1. These include a general-purpose (e.g., X-scale®) processor 412, micro-engines 416, and media switch fabric interface 408. For clarity, further details of network processor 402 are not shown in FIG. 4; it will be recognized that network processor further includes analogous elements to those shown in FIG. 1 that are missing in FIG. 4.

Additionally, FIG. 4 now shows media switch fabric 426, which is used to cross-connect a plurality of I/O ports, and is used in the manner described above. In the illustrated embodiment, the architecture employs a System Packet Interface Level 4 (SPI4) interface 438.

SRAM users on network processor 402, such as general-purpose processor 412 and micro-engines 416, are enabled to access SRAM store 422 via channels 0, 1, 2, and 3. In order to support concurrent multi-channel access to SRAM store 422 while removing access contention possibilities, the SRAM physical address space 426 is partitioned into respective segments for each of channels 0, 1, 2, and 3. In the illustrated embodiment, each channel segment is approximately equal to the other channel segments. However, this is not limiting, as the amount of SRAM physical address space allocated to each channel may vary, depending on the particularities of the implementation.

According to aspects of one embodiment, the forwarding information base is distributed across multiple channels of the SRAM store. The distribution scheme may include use of all channels, or may use only selected channels. For example, in the illustrated embodiment of FIG. 4, portions of the distributed FIB are stored in SRAM physical address space segments allocated to channels 0, 1, and 2, while the entirety of the physical address space segment allocated to channel 3 is reserved for other purposes. In accordance with another aspect, a portion of the distributed FIB may reside in a secondary memory store, such as depicted by forwarding information base portion "D" stored in DRAM 426.

Figure 5A:
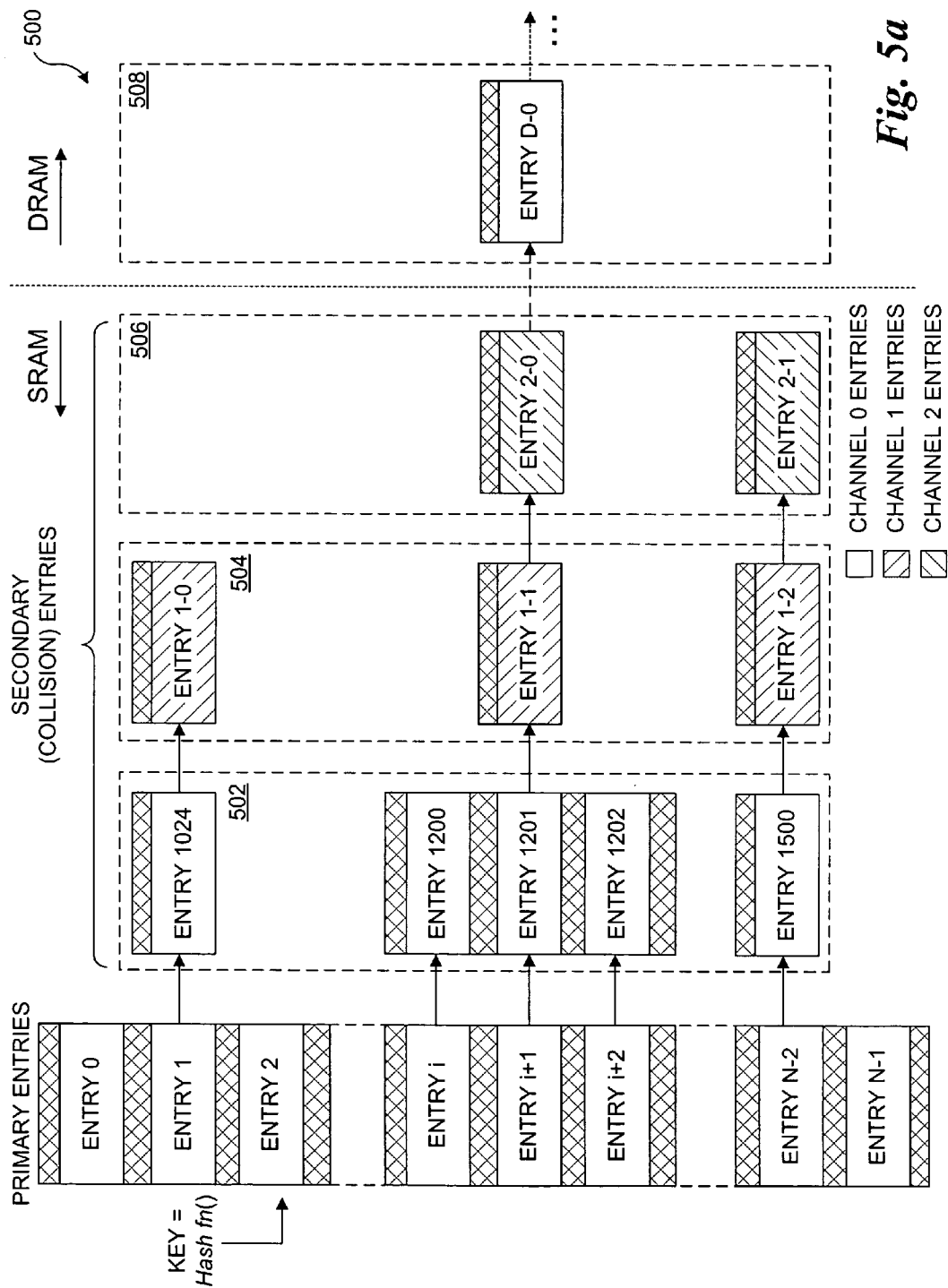
FIG. 5a is a schematic diagram illustrating an exemplary predetermined allocation scheme for storing FIB entries in accordance with the distributed FIB of FIG. 4.

As with a conventional unitary FIB, a distributed FIB contains various FIB entries that contain information for matching input parameters to corresponding next hop information. An exemplary distributed FIB entry allocation scheme, according to one embodiment, is shown in FIG. 5a. Under the scheme, a set of primary entries is stored in an FIB portion hosted by a selected channel. In the illustrated example, the channel is channel 0, and the FIB portion is FIB portion 0.

In FIG. 5a, there are N primary entries allocated to FIB portion 0. In this instance, the value of N corresponds to the bit width of the selected hash function (or the resulting bit width corresponding to multiple hash functions if a combination of hash functions are used). For example, if the bit width of the hash function is 10-bits, N will equal 1024 (i.e., $2^{10}$). Generally, the value of N may be selected based on various performance considerations, such as network traffic patterns and the number of routing table entries.

Hash functions are typically used to improve table lookup performance. Generally, it is advantageous to index table entries such that those table entries can be easily located. A hash function is a special type of indexing scheme. Rather than employing linear indexing, hashing functions group entries into "buckets" based on the result returned from the hash buckets. In the scheme of FIG. 5a, each primary entry comprises a hash bucket. Furthermore, each hash bucket can be easily located based on its "key," wherein each key corresponds to a unique result for the hash function. The number of possible unique results corresponds to the bit width of the hash function. Thus, there are N possible keys, and thus N hash buckets, each corresponding to a primary entry.

Ideally, each set of input parameters would map to a primary entry. However, this is not statistically realistic. On one hand, a large number for N would produce more primary entries. However, this would require a larger address space allocated to the FIB, which may not be available, and also would decrease hash processing performance. At the same time, choosing a value for N that is too low will lead to more collisions, which is not desired.

A collision results when multiple entries "map" to the same hash bucket. For example, in the exemplary distribution scheme of FIG. 5a, the input parameters of each ENTRY 1, ENTRY 1024, and ENTRY 1-0 when input to the same hash function, yield the same hash result, meaning a collision exists. In the embodiment of FIG. 5a, only one set of next hop information is allocated to each entry. Thus, there needs to be a mechanism for handling collisions so that next hop information that is not included in any of the primary entries can be retrieved.

The way collisions are handled in the distribution scheme of FIG. 5a is to employed a "linked list" of entries. When a first collision occurs, a first secondary entry is added to the linked list. For example, secondary entry 1024 corresponds to a first collision with primary ENTRY 1. That is, hashes resulting from processing the input parameters of ENTRY 1 and ENTRY 1024 both yield the same key, and thus map to the same hash bucket. In this embodiment, only one entry (the primary ETNRY 1 in this case) can be stored in the hash bucket, and thus the colliding entry must be stored elsewhere.

This leads to another aspect of the novel distribution scheme. Under conventional practices, an entire FIB is allocated to common SRAM address space, which is typically contiguous. Thus, all of the secondary entries are stored in the same address space, and thus must be accessed via the same SRAM channel. This leads to increased processing latencies, as only one memory access to the same channel may occur at one time.

Under the embodiments described herein, the FIB entries are distributed across multiple SRAM channels. This means that some of the FIB entries are located in one portion of the distributed FIB accessible via one channel, while other FIB entries are located in other portions of the distributed FIB that are accessible via other channels.

In one embodiment, the location of an FIB entry is determined by its depth in the linked list. For example, in the illustrated embodiments of FIG. 5a, FIB entries corresponding to a first level 502 of secondary entries are located in FIB portion 0 (corresponding to channel 0). Meanwhile, FIB entries corresponding to a second level 504 of secondary entries are located in FIB portion 1 (corresponding to channel 1), while FIB entries corresponding to a third level 506 of secondary entries are located in FIB portion 2 (corresponding to channel 2). It is noted that the ordering illustrated in FIG. 5a, is merely exemplary, as any ordering of the FIB portions may be employed, as applicable.

In general, the ordering of the FIB portion usage should consider the traffic (i.e., bandwidth consumption and availability) and/or space usage for each channel. For example, network processors employ SRAM stores for storing various types of data relating to the processing of packets, including data that is in addition to the FIB entries. Under some schemes, certain types of data may be allocated to certain channels. In some instances, selected portions of the address space segments allocated to the respective channels may be reserved in advance. Thus, the allocation of those address space segments may be readily ascertained.

Typically, a memory manager 440 or the like may be run on general-purpose processor 412. In another implementation, a thread running on one of micro-engines 416 may be used to perform the memory manager operations. The memory manager may be employed for managing allocation of system memory resources, such as SRAM store 422 and DRAM store 426, for example. In one embodiment, the memory manager (and/or another component) keeps statistical information concerning channel usage (bandwidth consumption/availability and space availability). Bandwidth availability is important, since multiple threads may attempt to access the same channel at the same time. This may lead to increased memory access latencies.

Overall, the idea is to allocate FIB entries that are more frequently accessed to memory resources that are most readily available. To obtain this ideal, this will generally include the two considerations discussed above—memory address space availability, and bandwidth availability. Since there will always be the same or more number of primary entries than any level of secondary entries (by definition, a linked list must begin with a primary entry), it will generally follow that a channel with a larger free address space be allocated to store the primary entries. However, this may not be the most advantageous allocation, as the remaining portion of the channel's address space may have higher usage than other channels with less available free space. In some embodiments, the primary entries will be allocated to a channel with the greatest available bandwidth. The ultimate determination for the distribution scheme will depend on the particularities of the implementation.

In accordance with yet another aspect of the embodiments, a mechanism is provided for limiting memory latencies for the vast majority of FIB entry accesses. Under this scheme, the entries of the linked list are partitioned between a primary memory store (e.g., an SRAM store) and a secondary memory store (e.g., a DRAM store). In general, the primary memory store will correspond to faster access memory, while the secondary memory store will correspond to slower access memory. The concept here is to partition the handling of packets that result in different memory access latencies, wherein a threshold is set such that packets that incur FIB lookup processing latencies below the threshold are handled using a primary scheme, while those packets that incur FIB lookup processing latencies above the threshold are handled by an exception scheme. Using the following depth level threshold scheme, the maximum number of memory accesses to retrieve next hop information using the primary scheme is fixed so that it cannot be exceeded. Thus, this sets a limit for the processing latency related to retrieving next hop information using the primary scheme.

Under one embodiment, this result is achieved by limiting the depth of the secondary entries handled by the primary scheme. For example, in distribution scheme 500, the primary scheme handles up to three levels of secondary entries (i.e., levels 502, 504, and 506). In the event that the level of an FIB entry exceeds the three-level threshold, an exception scheme is invoked to handle processing of the corresponding packet.

For example, FIG. 5a includes an entry D-0 corresponding to a fourth level 508 of secondary entries. In the illustrated embodiment, fourth and higher level FIB entries are stored an FIB portion D stored in DRAM store 426. In another embodiment, levels exceeding the threshold level may likewise be stored in the primary memory store; however, these entries are still handled by the exception scheme. Further details of how exception FIB entries are handled are described below.

Figure 6A:
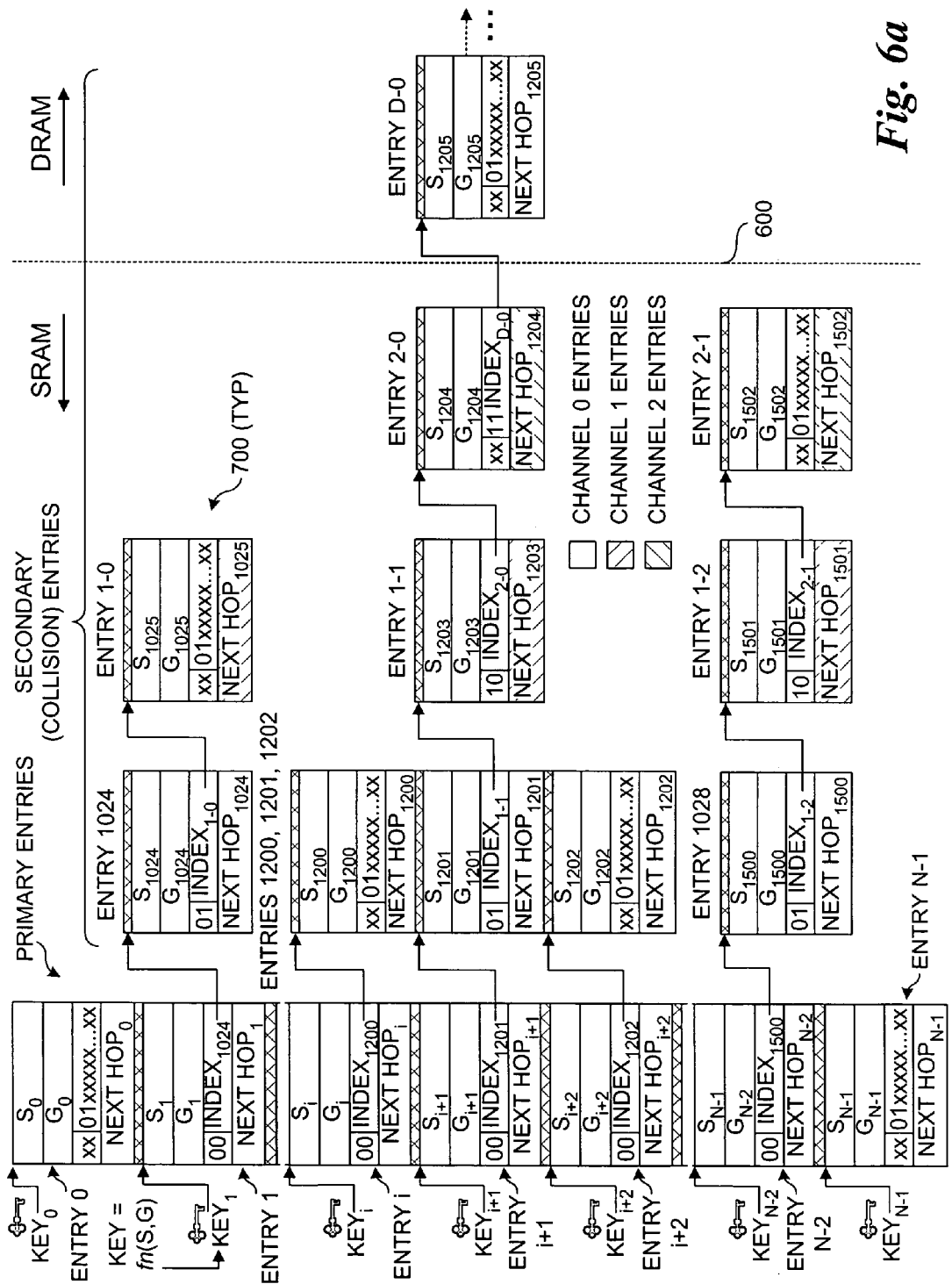
Figure 7A:
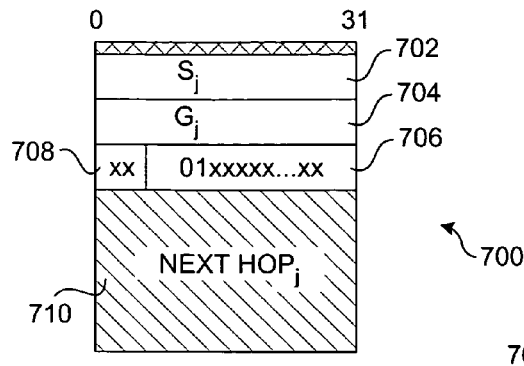
FIG. 7a is a schematic diagram illustrating details of an FIB entry, according to one embodiment of the invention.

To better illustrate how FIB entries are handled, attention is directed to FIG. 6a, which shows an exemplary implementation of the FIB entry distribution scheme of FIG. 5a. According to one embodiment of an FIB entry 700 shown in FIG. 7a, each FIB entry in FIG. 6a includes a source field 702, a group destination field 704, a channel field 706, a next link pointer 708, and next hop information 710. In one embodiment, channel field 706 and next link pointer 708 comprise a single field, wherein designated bits in the field (e.g., K highest order bits) are used to perform the same function as the bits described herein for channel field 706. In essence, the next entry pointer, in combination with the channel field value, is used to link to the entries in the linked list together.

In the illustrated embodiment of FIG. 6a, each FIB entry includes source and group destination addresses that are respectively labeled $S_j$, $G_j$, where j represents an integer. This nomenclature is used for convenience, as follows. The source and group destination addresses for a given FIB entry correspond to a unique combination of source and group destination addresses. Accordingly, the nomenclature $S_j$, $G_j$ corresponds to a set j of source and group destination addresses. The particular subscript value j for a given source or group destination address, taken separately (from the set), is irrelevant. For example, consider the sets $\{S_0, G_0\}$ and $\{S_1, G_1\}$. The possibilities for these sets include: $\{S_0 \neq S_1, G_0 \neq G_1\}$, $\{S_0 = S_1, G_0 \neq G_1\}$, and $\{S_0 \neq S_1, G_0 = G_1\}$. However $\{S_0 = S_1, G_0 = G_1\}$ is not a possible combination, as the combination of each pair is unique.

In the embodiment of FIG. 6a, a hash key is used to locate each primary entry. For example, the hash key may be translated into a corresponding base address for a given primary entry. The hash key is derived from a hash function fn that employs the source and group destination addresses S, G as inputs. In response to processing the hash function, a corresponding hash key is generated. As explained above, while the hash key for each entry in the primary entries is guaranteed to be unique, different sets of $S_j$, $G_j$, inputs may produce the same hash key result. Under this situation, a collision exists.

Figure 8A:
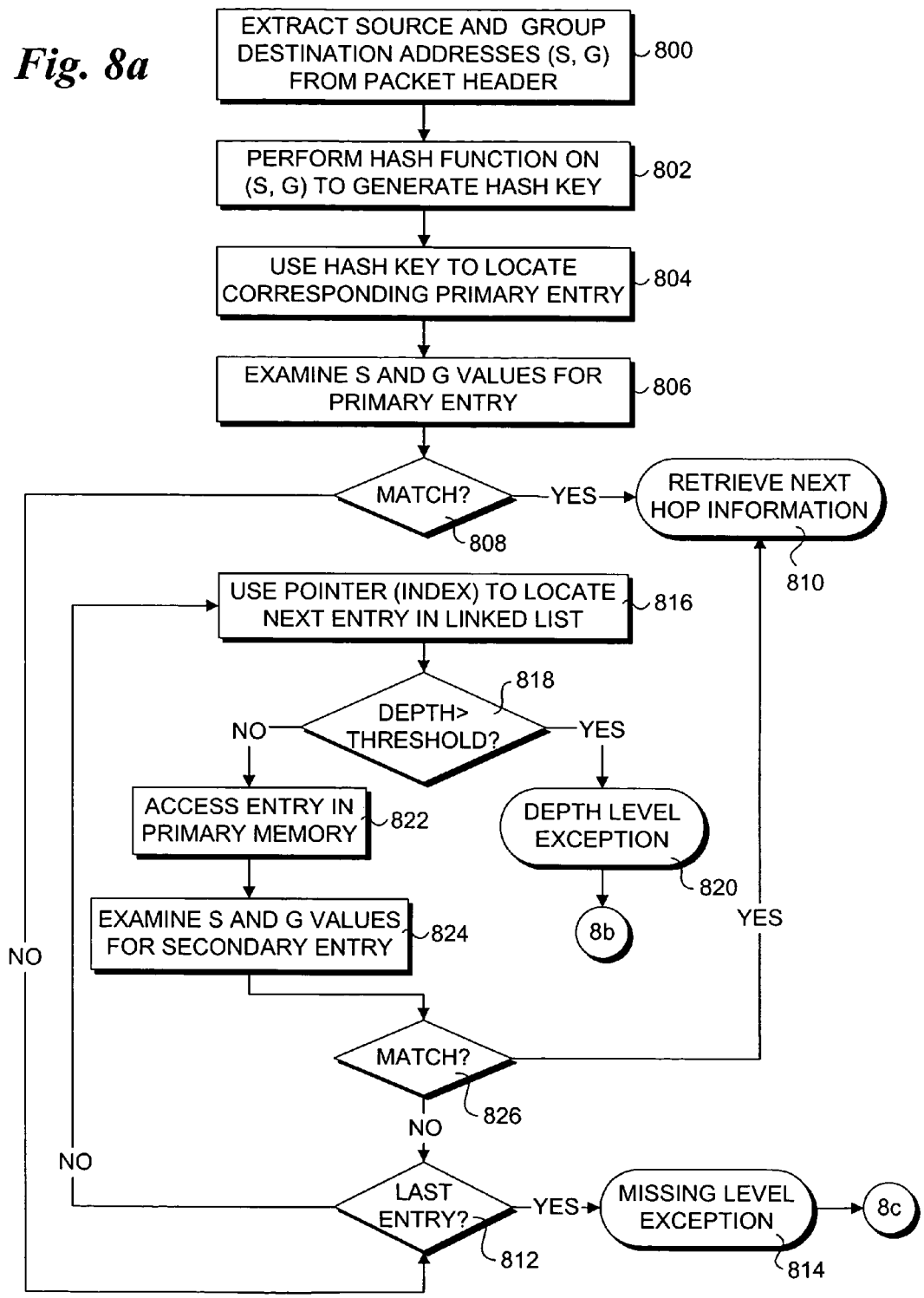
FIG. 8a is a flowchart illustrating FIB operations performed during packet processing, according to one embodiment of the invention.

A flowchart illustrating FIB entry processing operations, according to one embodiment, is shown in FIG. 8a. The process starts in a block 800, wherein the source and group destination addresses S and G are extracted from a packet header. Next, in a block 802, a hash function is performed using S and G as inputs to generate a hash key. The hash key is then used to locate a corresponding primary entry in a block 804. Data corresponding to the primary entry is retrieved, and the S and G values for the primary entry are examined in a block 806.

In a decision block 808, a determination is made to whether the S and G values in the primary entry match the S and G addresses extracted in block 800. If they match, the appropriate entry has been located, and the next hop information is returned in a return block 810, completing the FIB processing for the packet. If a match does not exist, the logic flows to a decision block 812 in which a determination is made to whether the entry is the last entry in its linked list. This determination may be made by one of several techniques. For example, in one embodiment the next entry pointer 710 is encoded to indicate the entry is the last entry in a linked list. In the embodiment of FIG. 6a, this is indicated by next entry pointers that begin with "01." In another embodiment, a null next entry pointer is used to identify the entry is the last in the linked list. In yet another embodiment, one or more bits in channel field 706 are used to identify last entries.

Figure 8B:
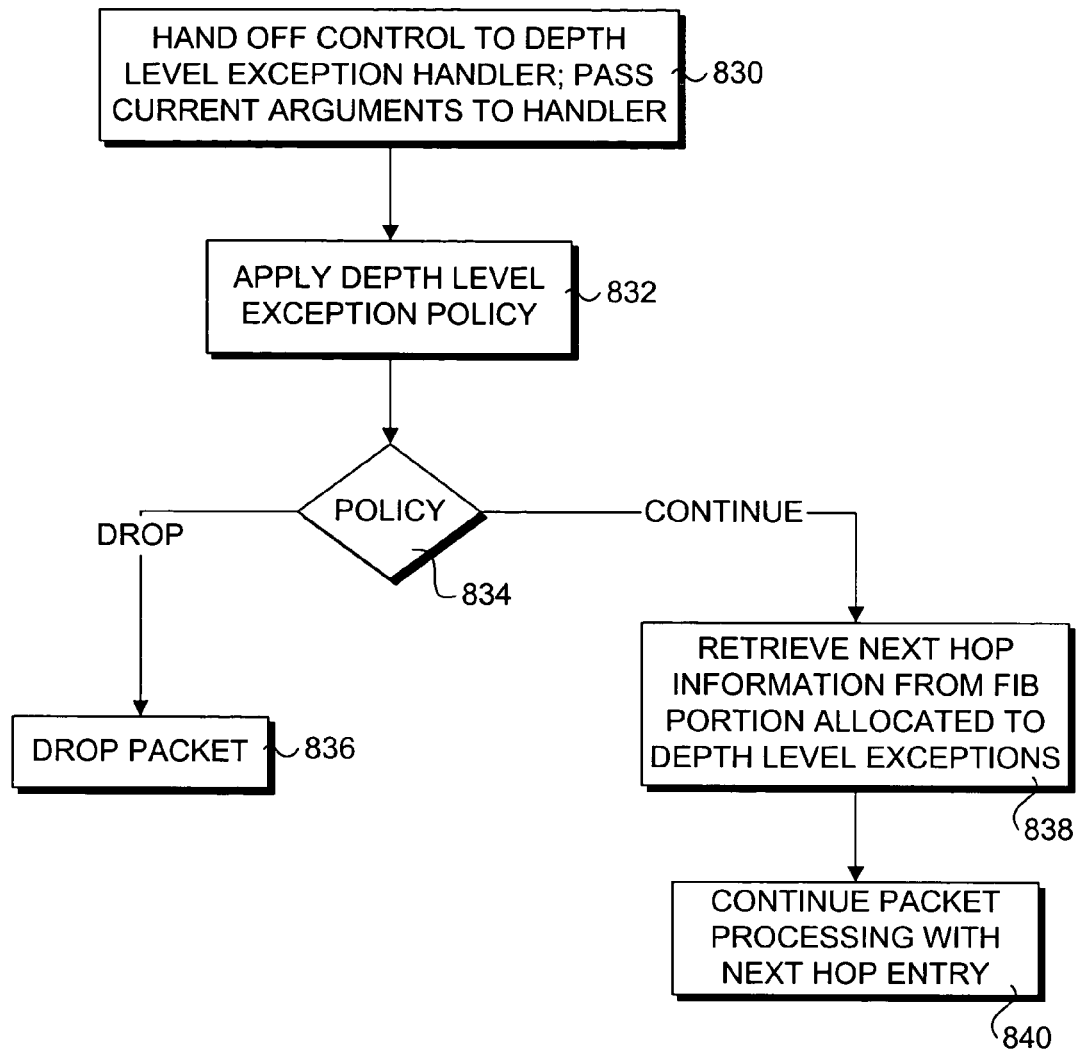
FIG. 8b is a flowchart illustrating operations performed by a depth level exception handler, according to one embodiment of the invention.
Figure 8C:
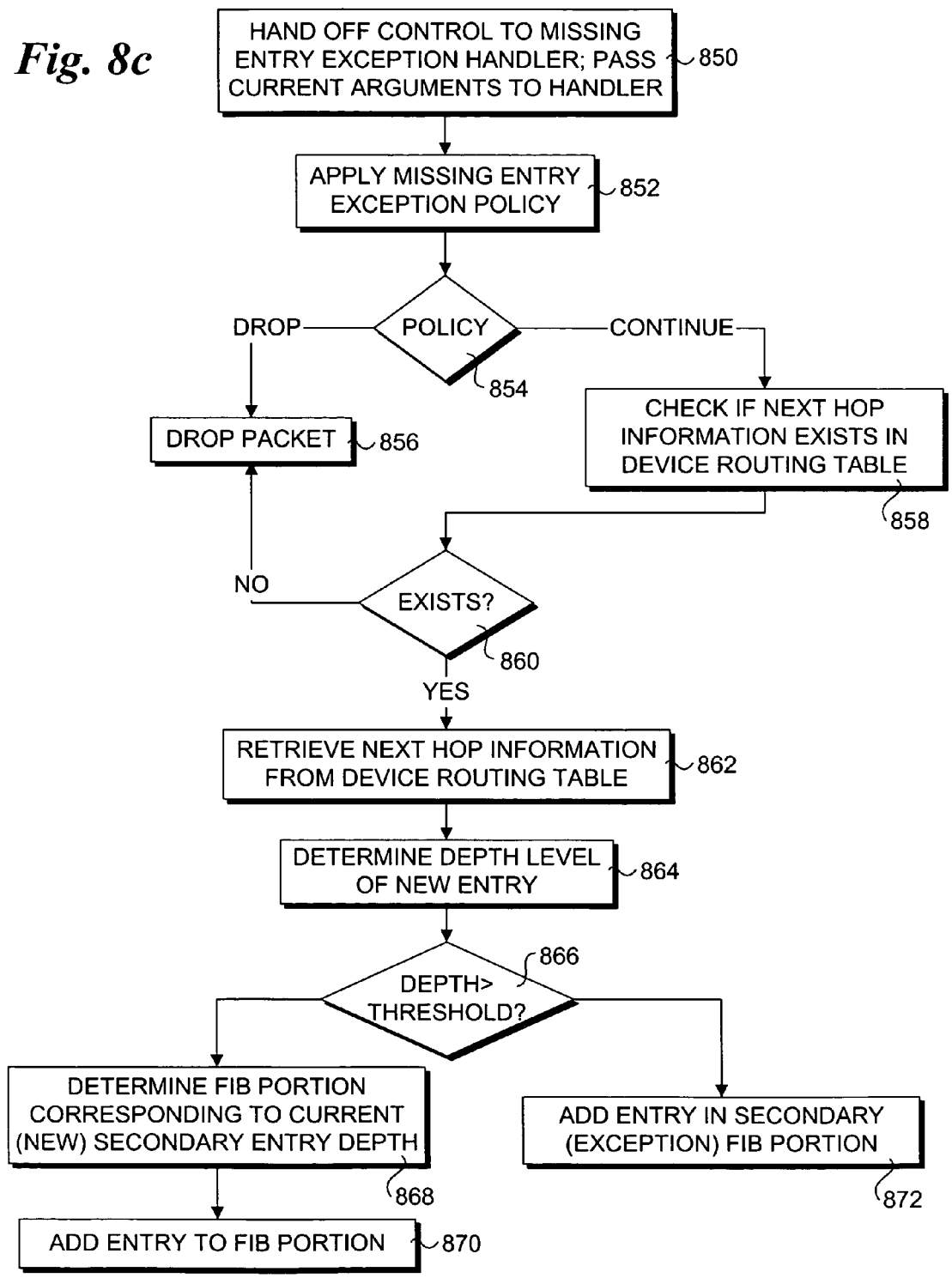
FIG. 8c is a flowchart illustrating operations performed by a missing entry exception handler, according to one embodiment of the invention.

If the process reaches a last entry without a match, the distributed FIB does not include an entry from which the next hop information for the current packet can be obtained. Accordingly, this creates a missing entry exception, as shown by a return block 814. Details of one embodiment of a corresponding missing entry exception handler are shown in FIG. 8c and discussed below.

If the entry is not the last entry, the logic proceeds to a block 816 in which the next entry pointer of the current entry is used to locate the next entry in the linked list. In a decision block 818 a determination is made to whether the depth of the next entry (i.e., its secondary entry level) exceeds the secondary entry-level depth threshold. If it does, a depth level exception results, as depicted by a return block 820. Details of one embodiment of a corresponding depth level exception handler are shown in FIG. 8b and discussed below.

If the depth level threshold has not been reached, the next entry is contained within the primary memory (e.g., SRAM), and is accessed from the primary memory in a block 822. In a block 824 the S and G values for this secondary entry are examined, and a determination of whether a match exists between the S and G values and the S and G addresses extracted in block 800 is made in a decision block 826. If a match exists, the process proceeds to return the next hop information for the entry in block 810 in the manner discussed above. If a match does not exist, the logic returns to decision block 812. The operations of blocks 812, 814, 816, 818, 820, 822, 824, and 826 are then repeated on an iterative basis until either a match is identified, or a missing entry or depth level exception occurs.

Returning to FIG. 6a, suppose that the source and group destination addresses S and G extracted from a packet are $\{S_0, G_0\}$. A hash performed over $S_0$, $G_0$ generates a hash key$_0$. From this key, ENTRY 0 is located. In block 808 it is determined that the S and G values for ENTRY 0 (i.e., $\{S_0, G_0\}$) match the extracted values $\{S_0, G_0\}$. As a result, the next hop information (shown as NEXT HOP$_0$) is returned to the caller in return block 810.

Now consider a case in which the extracted S and G addresses are $\{S_{1025}, G_{1025}\}$. The corresponding matching values are present in ENTRY 1-0. This entry represents the first entry in FIB portion 1. The process to access this entry proceeds as follows. Operations in blocks 800, 802, 804 are performed to generate a hash key$_1$. This key is used to locate ENTRY 1, the primary entry for the hash result of fn($S_{1025}$, $G_{1025}$). Operations in blocks 806, and 808 are performed, resulting in a NO answer for decision block 808. ENTRY 1 is not the last entry in its linked list, so the process proceeds to locate ENTRY 1024 via the next entry pointer (INDEX$_{1024}$) in ENTRY 0, as performed in block 816. This entry is processed via the operations of blocks 818, 822, 824, and 826, resulting in a NO match for decision block 826. Again, ENTRY 1024 is not the last entry in the linked list beginning with primary ENTRY 1, and thus the process loops back to block 816 again. This time, the next entry pointer (INDEX$_{1-0}$) locates ENTRY 1-0, the correct entry. Thus, a match results, and the next hop information (NEXT HOP$_{1025}$) for the source and group destination address pair $\{S_{1025}, G_{1025}\}$ is returned in return block 810.

Now let us consider S and G address pair $\{S_{1205}, G_{1205}\}$. The entry storing the corresponding S and G values is ENTRY D-0, which is located at a depth that exceeds a secondary entry depth level threshold 600. In this illustrated embodiment, ENTRY D-0 is stored in FIB portion D, which is located in DRAM store 426.

As discussed above, when the secondary entry-level depth threshold is exceeded, the answer to decision block 818 is YES (TRUE), and the logic proceeds to handle the depth level exception in accordance with block 820. This situation may occur, for example, in response to processing ENTRY 2-0 in the embodiment of FIG. 6a. As depicted, ENTRY 2-0 is not the last link in its linked list, but is the last entry prior to depth level threshold 600. An attempt to "cross" the depth level threshold generates a corresponding exception.

An exemplary process for handling a depth level exception, according to one embodiment, is shown in FIG. 8b. The process begins in a block 830, wherein execution control is handed off to a depth level exception handler. This includes passing the current arguments (S, G, next link pointer and channel field values) to the exception handler. As depicted by a block 832 and a decision block 834, the first operation performed by the exception handler is to apply a depth level exception policy. In some cases, the policy may simply drop the corresponding packet, as depicted in a block 836. In other cases, facilities will be provided for further handling of the packet. For example, in the illustrated embodiment, a continue policy leads to a block 838, in which the next hop information is retrieved from an entry located in an FIB portion allocated to depth level exceptions. In the embodiments of FIGS. 4 and 6a, this FIB portion is FIB portion D, which is located in DRAM 426.

In one embodiment, the next link pointer 708 is encoded to indicate when a depth level exception is invoked. For example, the next link pointer 708 of entry 2-0 begins with a "11", which identifies a depth level exception handler process should be invoked. The rest of the next link pointer is an index to the FIB portion used for handling depth level exception entries—e.g., FIB portion D in this instance.

Returning to FIG. 8a, if the process proceeds down a chain to the end without identifying an appropriate entry for the S and G inputs, there was no match for the last entry, causing the logic to proceed to block 814 to handling the missing entry exception. An exemplary process for performing this task is shown in FIG. 8c.

The process begins in a block 850, wherein execution control is handed off to a missing entry exception handler. This includes passing the current arguments (S, G, next link pointer and channel field values) to the exception handler. As depicted by a block 852 and a decision block 854, the first operation performed by the exception handler is to apply a missing entry exception policy.

In some cases, the policy may simply drop the corresponding packet, as depicted in a block 856. This might be for policy reasons, or may be based on the FIB configuration as it relates to routing table information. In some implementations, the FIB entries are derived from this routing table information, wherein the routing table information is maintained in a separate memory store from the memory store(s) used for the FIB portions (or at least the primary memory for FIB entries). The routing table information is gathered using well-known techniques, such as using the Border Gateway Protocol, and is outside the scope of this disclosure. In some embodiments, the entirety of the routing table is maintained in the FIB. As a result, if the process has got to the end of a linked list with no match, there is no appropriate for forwarding information available to the network device, and thus no action can be taken. Thus, the packet will be dropped.

Under a more common situation, the FIB contains next hop information pertaining to a subset of the routing table. This is because a routing table may have 1000's or even 10,000's of entries, making it unfeasible for storing these entries in a primary fast-access memory store, such as SRAM. Thus, the FIB, in some respect, operates as a type of cache for the routing table, where the entries stored in the FIB relate to routes that are most frequently used. This is depicted in FIG. 4, wherein a routing table 442 is stored in DRAM 426.

Thus, under one continuation policy, the first continuing operation is to check if next hop information exists in the network device's routing table, as depicted by a block 858 and a decision block 860. If the next hop information is not present, the logic proceeds to drop the packet in block 856. If the next hop information is present, it is retrieved from the routing table (e.g., routing table 442) in a block 862.

The next check is to determine the depth level of the current linked list, as depicted by a block 864 and a decision block 866. If the depth level is less than the depth level threshold, the logic proceeds to a block 868, wherein the FIB portion for the current level of the new secondary entry (the level of the new link in the linked list) is determined. A new entry is then added to that FIB portion in a block 870. If the depth of the new link would exceed the depth level threshold, the entry is added to the FIB portion allocated for exceptions in a block 872.

Figure 6B:
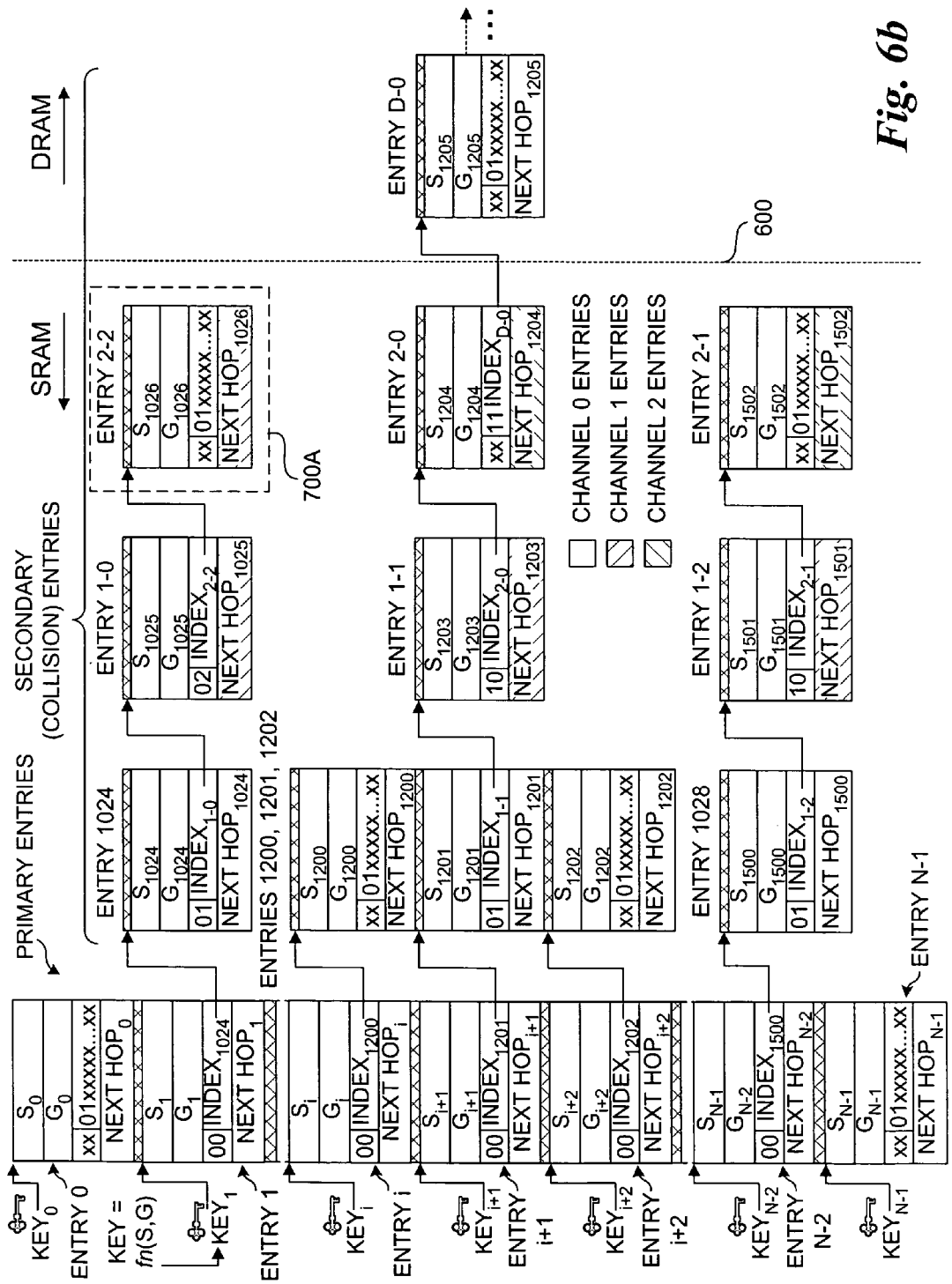

An example of a new entry is shown in FIG. 6b. In this example, the new entry corresponds to S and G address pair $\{S_{1026}, G_{1026}\}$. Using these values as inputs to the hash function fn, the returned key1 is used to locate primary entry 1. As the FIB lookup proceeds down the change, it reaches ENTRY 1-0 without finding S and G values corresponding to pair $\{S_{1025}, G_{1025}\}$. In accordance with the new entry policy, it is determined in decision block 860 that a routing table entry for $\{S_{1025}, G_{1025}\}$ exists. Additionally, in decision block 866 it is determined that the depth level for the new entry is less than the depth level threshold. The depth level for the new secondary entry is level three, which is determined to be hosted by FIB portion 2 in block 868. Thus, a new entry 700A (labeled ENTRY 2-2) is added to FIB portion 2 in block 870.

It is noted that the primary entries will generally be loaded into the primary FIB portion prior to putting the network device on-line. However, it is possible to dynamically add primary entries in a manner analogous to the missing entry exception handling process of FIG. 8c. In this case, the operation of block 870 will add a new primary entry to the primary entry FIB portion.

In addition to adding entries, entries may be "re-ordered" using one of various schemes. For example, it may be desired to re-order entries in a given linked list if it is determined that an entry toward the end of the list is being accessed more frequently than another entry located earlier in the list. The determination of the frequency of access for a given entry may be determined by using one of many well-known performance monitoring techniques. Accordingly, the specific details for determining the frequency of access for entries is not disclosed herein.

According to one embodiment, entries are re-ordered by swapping the data in the entries while maintaining the next link pointer and channel data. For example, in the embodiment of FIG. 6c, the order of the entry corresponding to source and group destination pair $S_{1502}, G_{1502}$ is moved forward two levels, such as to replace the original values in ENTRY 1028. It is noted that in this embodiment, the location of the entries (i.e., the entry data structures) are not moved. Rather, the data are swapped. Thus the S and G values ($S_{1502}$, $G_{1502}$) and the next hop information (NEXT $HOP_{1502}$) in ENTRY 2-1 is moved to ENTRY 1028, while similar data in ENTRY 1028 is moved to ENTRY 1-2, and similar data in ENTRY 1-2 is moved to ENTRY 2-1. This scheme as the advantage of moving the more-frequently accessed entries to FIB portions having a higher use preference. It is noted that it is also possible to swap primary and secondary entries in this manner.

Figure 6C:
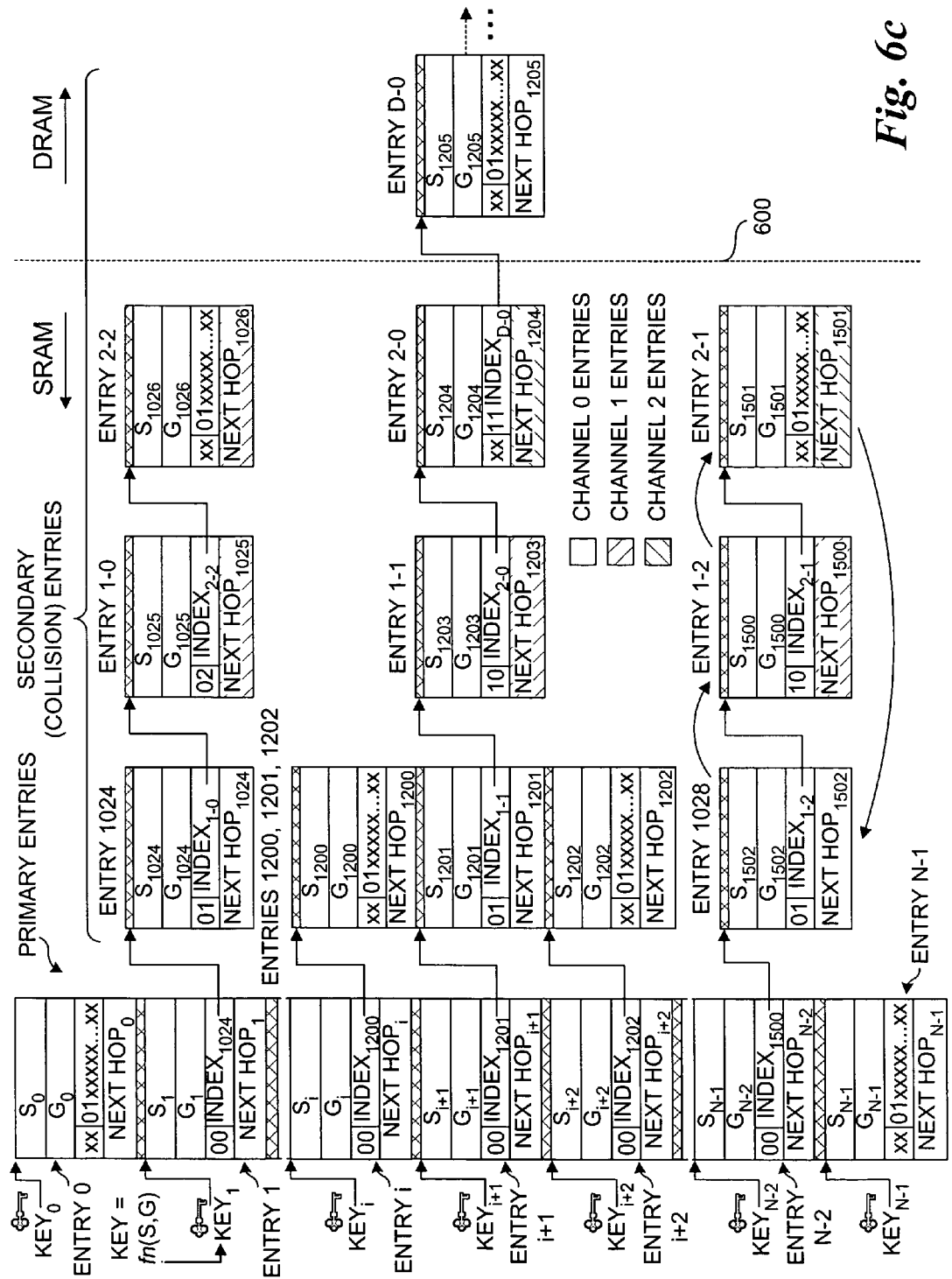
FIG. 6c illustrates a first scheme for re-ordering FIB entries, wherein entry information is moved between existing entries.
Figure 6D:
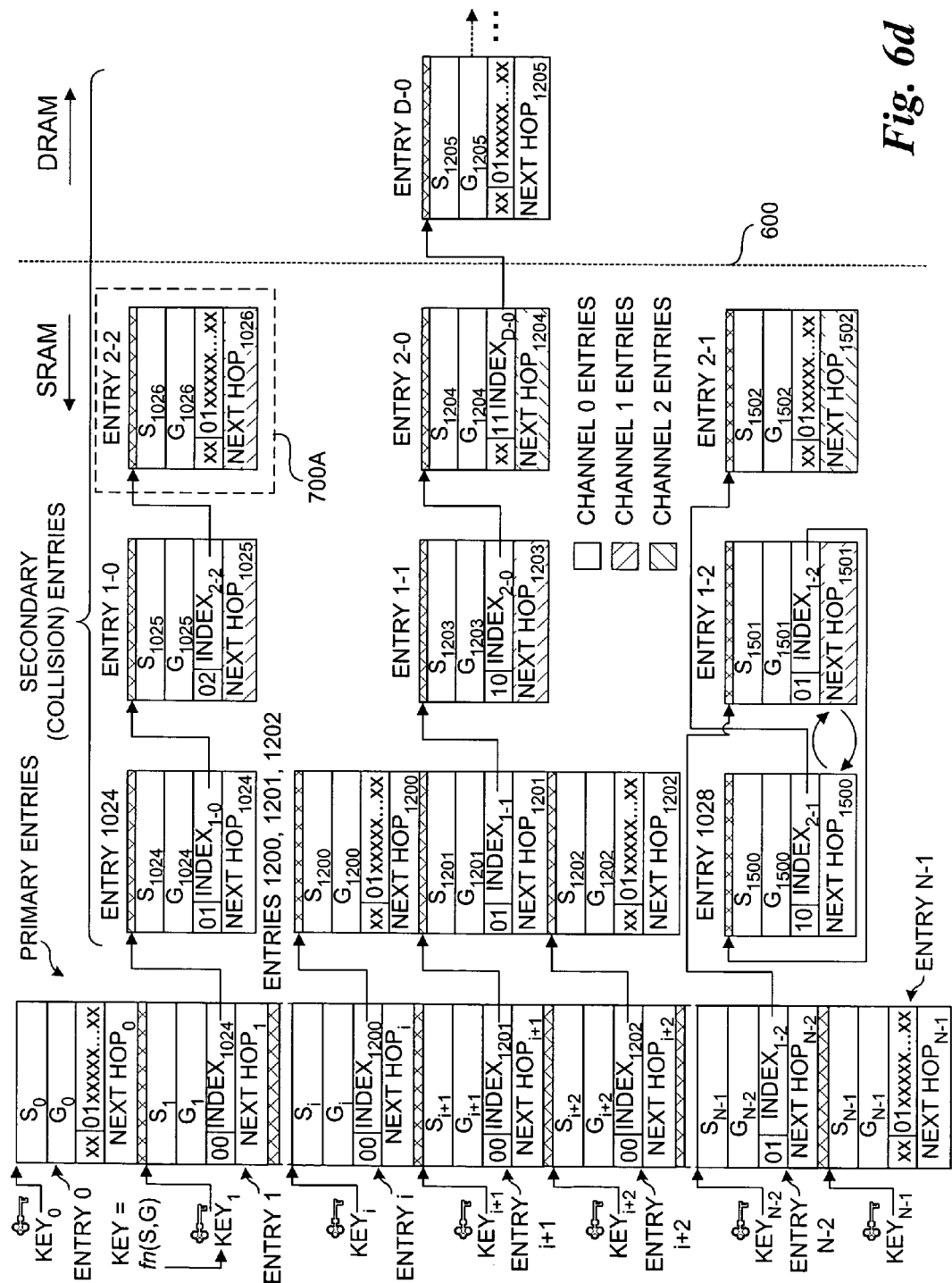
FIG. 6d illustrates a second scheme for re-ordering FIB entries, wherein channel and next entry pointer data are changed to point to new locations for the re-ordered FIB entries.

In the embodiment of FIG. 6c, the secondary entries are re-ordered by simply changing the next link pointers and channel values. For example, in this example the entries originally stored in ENTRY 1028 and ENTRY 1-2 are swapped. This requires updating the data in channel field 706 and the next link pointer 708 for ENTRY N-2, ENTRY 1028, and ENTRY 1-2. This scheme has the advantage of requiring changes to only a single long word for each entry that is affected. However, it can not be used to swap primary and secondary entries.

Figure 9:
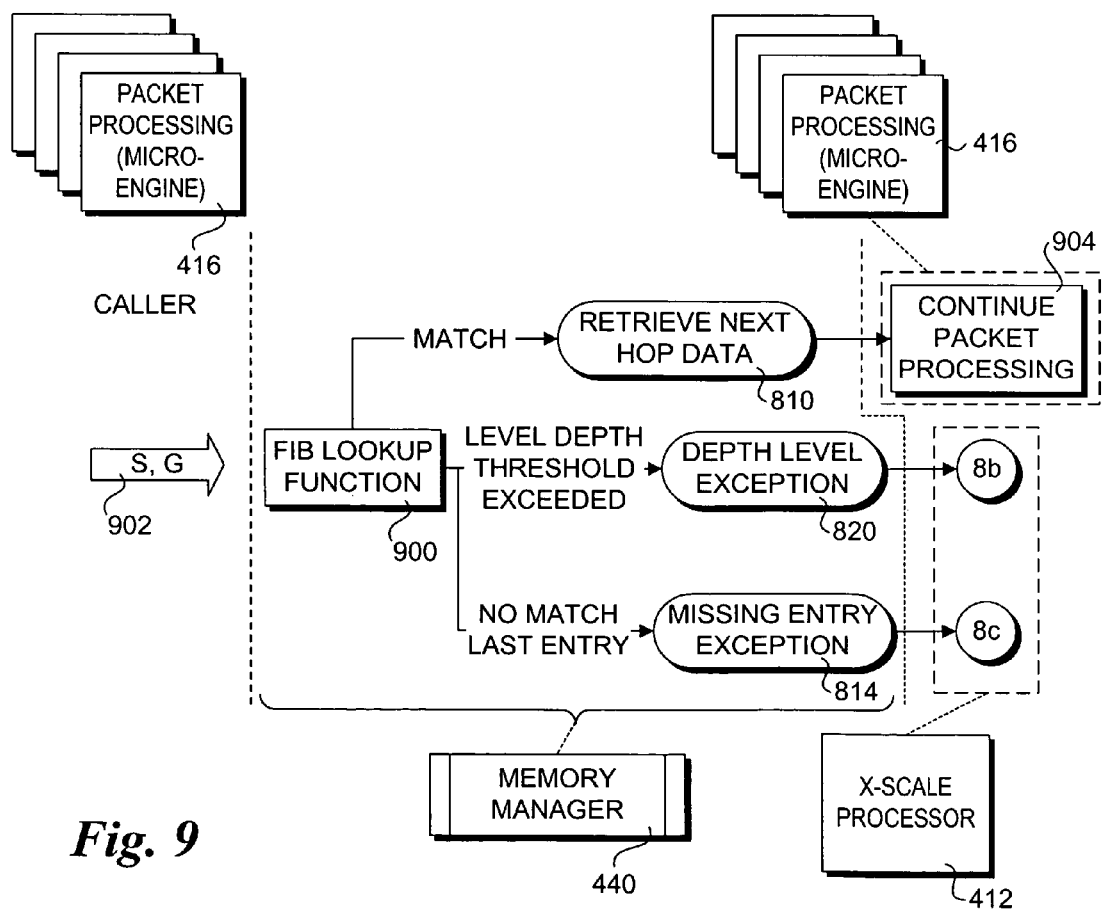
FIG. 9 is a schematic diagram illustrating an execution-partitioning scheme for packet processing, according to one embodiment of the invention.

FIG. 9 shows an execution path for handling various packet-processing scenarios, according to one embodiment. Under a typical network processor implementation, packet processing is primarily handled by micro-engines 416. This includes a call to an FIB lookup function 900 using S and G inputs 902. Generally, the FIB lookup function may be performed by a micro-engine thread, or by a separate execution thread comprising memory manager 440. The memory manager thread may be executed on a micro-engine, or on a general-purpose processor, such as general-purpose processor 412.

The FIB lookup function generally corresponds to the operations performed in the flowchart of FIG. 8a. If the process proceeds to return block 810, control is passed back to the original caller (i.e., the calling micro-engine thread), and packet processing is continued in a block 904. However, if either a depth level exception or a missing entry exception occurs, execution is passed to an appropriate exception handler. In the embodiment of FIG. 9, these execution handlers are executed by threads running on general-purpose processor 412. In another embodiment (not shown), a separate micro-engine thread (other than the calling thread) may be employed to handle one or both of these exceptions. In other cases, facilities will be provided for further handling of the packet.

Figure 5B:
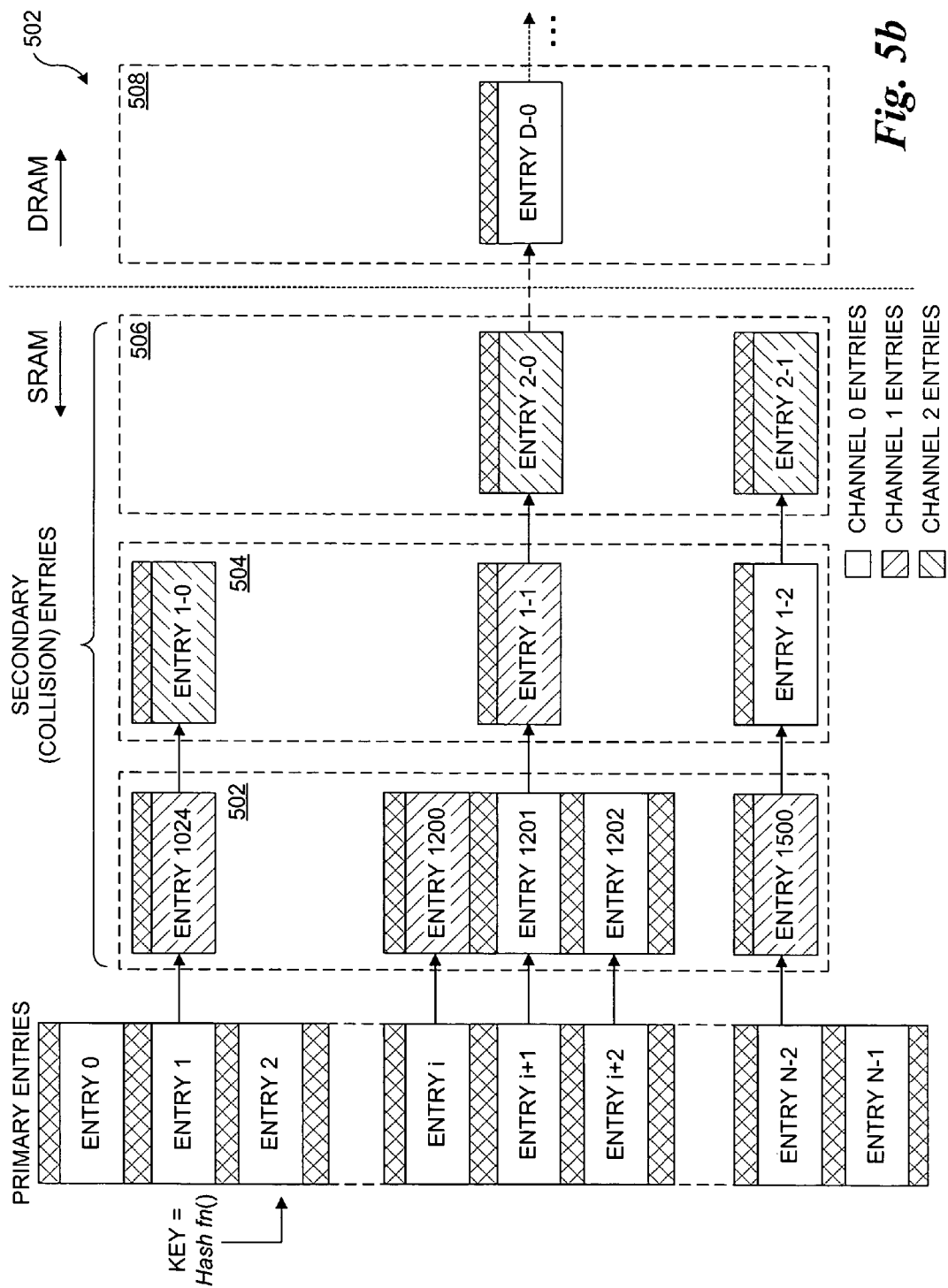
FIG. 5b is a schematic diagram illustrating an exemplary mixed allocation scheme for storing FIB entries in accordance with the distributed FIB of FIG. 4.

In addition to allocating secondary entries at given depth levels to particular channels, it is also possible to allocate secondary entries based on dynamic conditions consideration, which produces a "mixed" channel allocation scheme. Mixed-channel allocation of secondary entries may also be produced using a predetermined scheme, such as using round robin arbitration. FIG. 5b illustrates an exemplary FIB entry distribution configuration illustrative of a mixed channel allocation.

Figure 7B:
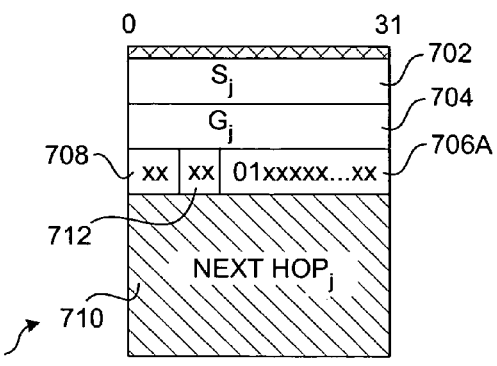
FIG. 7b is a schematic diagram illustrating details of an augmented version of the FIB entry of FIG. 7a, further including a depth level field, according to one embodiment of the invention.

Mixing channel allocations at given depth levels requires some mechanism for identifying the depth level of a secondary entry. In one embodiment illustrated in FIG. 7b, an FIB entry 700B comprises an augmented version of FIB entry 700 with the further addition of a depth level field 712. The bit width of the depth level field will depend on the depth level threshold value. FIB entry 700B also includes a shortened next link pointer 706A. As before, the channel field 708 value, the depth level field 712 value and next link pointer 706A value may be combined in a single field using various encoding configurations.

Figure 10A:
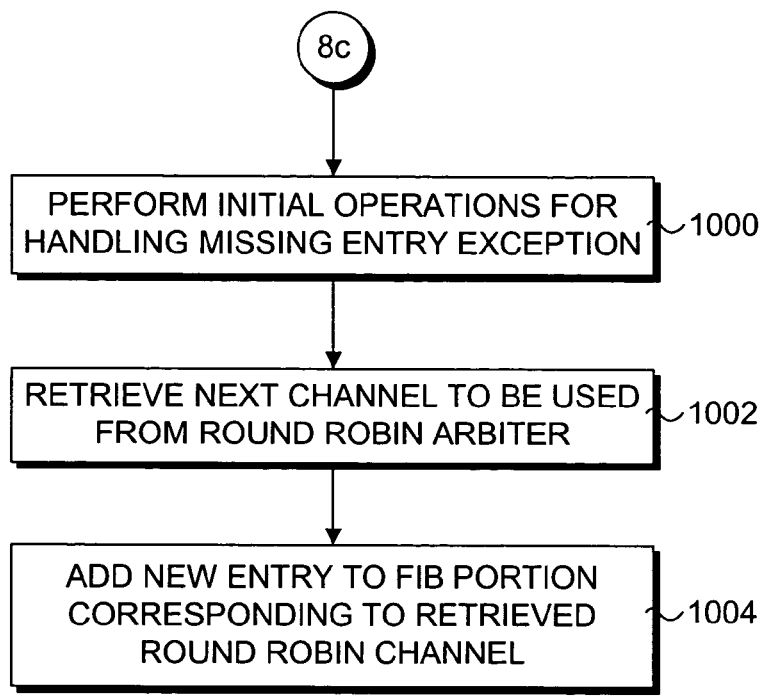
FIG. 10a is a flowchart illustrating operations performed during a round robin channel allocation scheme, according to one embodiment of the invention.

Operations corresponding to one embodiment of an exemplary round robin channel arbitration scheme are shown in FIG. 10a. The process begins in response to a missing entry exception resulting from the process of FIG. 8a, as depicted by a jump to block 8c. As depicted in a block 1000, the initial operations for handling a missing entry exception discussed above with reference to FIG. 8c are performed. This generally includes the operations up to and including decision block 872.

At this point, the next channel to be used for the new entry is retrieved from a round robin arbiter in a block 1002. Mechanisms for implementing round robin arbitration schemes are well-known in the art, so specific details are not included herein. The process is completed by adding the new entry to the FIB portion corresponding to the retrieved round robin channel in a block 1004.

Figure 10B:
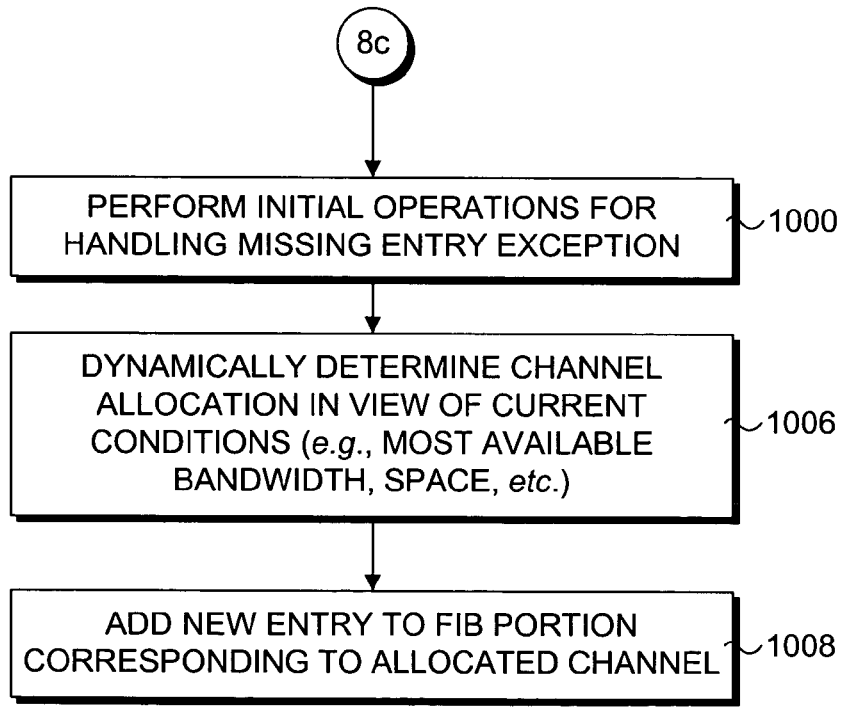
FIG. 10b is a flowchart illustrating operations performed during a dynamic channel allocation scheme, according to one embodiment of the invention.

Operations corresponding to one embodiment of an exemplary dynamic channel allocation scheme are shown in FIG. 10b. As with the process of FIG. 10a, in response to a missing entry exception, operations up to and including decision block 872 are performed, as depicted by block 1000. In a block 1106, the channel allocation is dynamically determined based on observation of current operating conditions. For example, in one embodiment a channel with the most bandwidth currently available is selected. In another embodiment, a channel with the most amount of free space remaining in its segment or FIB portion is selected. In yet another embodiment, a channel-selection algorithm is employed that uses weighted considerations for the bandwidth and remaining free space parameters. The process is then completed in a block 1008, wherein a new FIB entry is added to the FIB portion corresponding to the channel that is allocated in block 1006.

Figure 11:
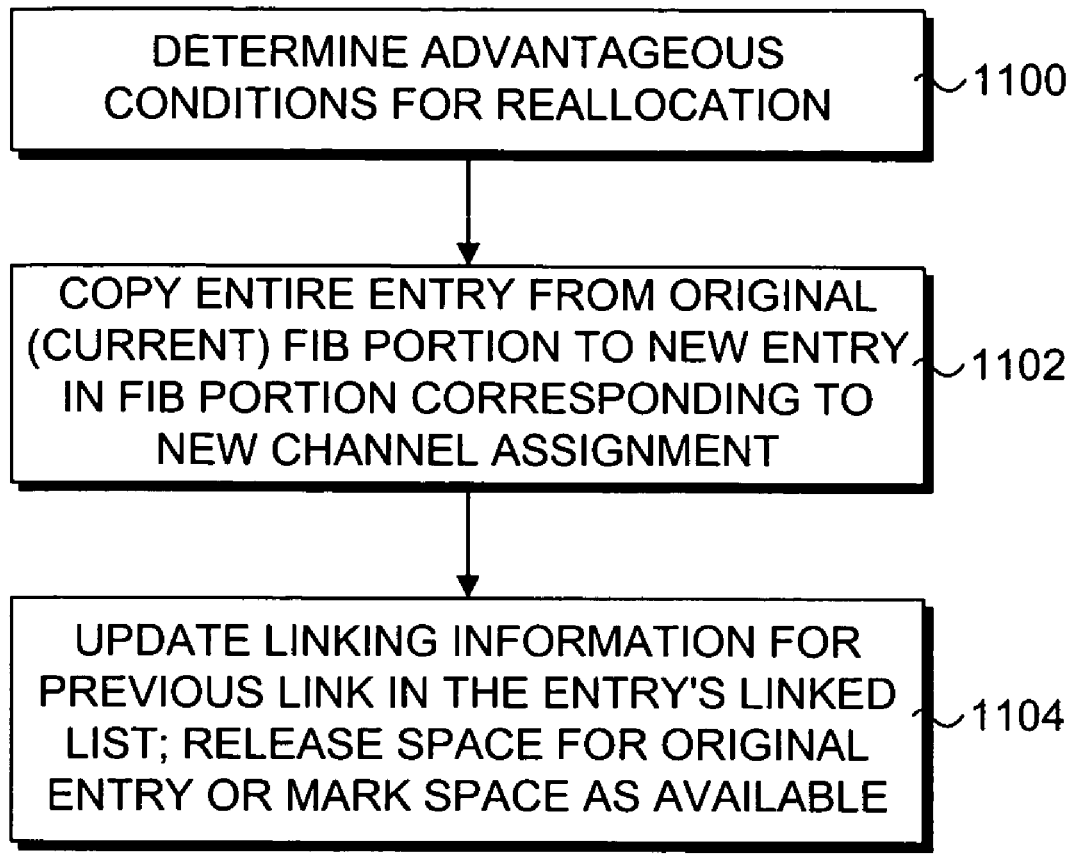
FIG. 11 is a flowchart illustrating operations performed during reallocation of existing entries, according to one embodiment of the invention.

As discussed above, existing entries may be reordered to improve access to the next hop information corresponding to those entries. In addition, existing entries may be reallocated to other FIB portions. For example, a flowchart illustrating operations performed during one embodiment of a reallocation process is shown in FIG. 11.

The process begins in a block 1100, wherein a determination is made to when operating conditions are advantageous for reallocations. There are many considerations that may effect this determination, including bandwidth and space availability of the various channels, access frequency of specific entries, etc. In response to a detection of appropriate conditions, a reallocation of one or more entries is performed. A reallocation begins in a block 1102 by copying an entire entry from its location in the FIB portion to which it is currently assigned to a new entry in an FIB portion corresponding to a new channel assignment. The process is completed in a block 1104 by updating the linking information for the previous link in the moved entry's linked list. This causes the previous entry's link to now point to the new location for its following entry (the moved entry). At the same time, the link information in the moved entry does not need to be updated, as it still points to the following entry. In one embodiment, the space occupied by the original entry is then released. Optionally, the space can be marked as "available" by memory manager 440.

Generally, the operations in the flowcharts described above will be facilitated, at least in part, by execution of threads running on micro-engines and general-purpose processors or the like. Thus, embodiments of this invention may be used as or to support a software program and/or modules or the like executed upon some form of processing core (such as a general-purpose processor or micro-engine) or otherwise implemented or realized upon or within a machine-readable medium. A machine-readable medium includes any mechanism for storing information in a form readable by a machine (e.g., a processor). For example, a machine-readable medium can include such as a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method implemented by a network processor comprising:
   distributing a forwarding information base (FIB) across a plurality of FIB portions hosted by at least one memory store of the network processor;
   storing a plurality of primary FIB entries including a first FIB entry in a first FIB portion;
   storing a plurality of secondary FIB entries including a second FIB entry in other FIB portions including a second FIB portion, each secondary FIB entry being a member of a linked list having a first link comprising one of the primary FIB entries in the first FIB portion;
   locating the primary FIB entries using a hash-based indexing scheme;
   locating the first FIB entry based at least in part upon header information of a received packet;
   locating the second FIB entry based at least in part on linking information obtained from the first FIB entry;
   retrieving next hop information for the received packet from the second FIB entry;
   defining a depth level threshold specifying a limit of a number of the secondary FIB entries that may be processed using a first execution thread of the network processor; and
   employing a second execution thread of the network processor to handle processing of the secondary FIB entries having a depth level that exceeds the depth level threshold.

2. The method of claim 1, wherein said at least one memory store includes a multi-channel memory store, the method further comprising:
   assigning respective FIB portions to respective channels used to access the multi-channel memory.

3. The method of claim 2, wherein said multi-channel memory store comprises a multi-channel static random access memory (SRAM) store.

4. The method of claim 2, wherein the secondary FIB entries are allocated to FIB portions using a mixed allocation scheme.

5. The method of claim 4, further comprising:
   employing a round robin arbitration scheme to allocate memory channels to secondary FIB entries as those secondary FIB entries are added; and
   storing each added secondary FIB entry in the FIB portion assigned to the memory channel allocated to the secondary FIB entry.

6. The method of claim 4, further comprising:
   dynamically determining allocation of memory channels to secondary FIB entries as those secondary FIB entries are added based on current memory store operating conditions; and
   storing each added secondary FIB entry in the FIB portion assigned to the memory channel allocated to the secondary FIB entry.

7. The method of claim 1, wherein said first FIB portion is hosted by a first memory store, and said second FIB portion is hosted by a second memory store.

8. The method of claim 1, wherein the first FIB portion is stored in a static random access memory (SRAM) store and the second FIB portion is stored in a dynamic random access memory (DRAM) store.

9. The method of claim 1, further comprising:
   storing a second plurality of secondary FIB entries in the first FIB portion.

10. The method of claim 1, further comprising:
    defining a depth level threshold specifying a limit of the number of secondary FIB entries in a linked list that may be stored in one or more FIB portions hosted by a first access memory store; and
    storing secondary entries in a linked list having a level greater than the depth level threshold in an FIB portion hosted by a second access memory store, wherein the second access memory store is slower than the first access memory store.

11. The method of claim 1, wherein the first execution thread comprises a first thread executed by a first micro-engine of a network processor and the second execution thread comprises one of:
    a second thread executed by the first micro-engine; or
    a thread executed by a second micro-engine.

12. The method of claim 1, wherein the first execution thread is executed by a micro-engine of a network processor and the second execution thread is executed by a general-purpose processor on the network processor.

13. The method of claim 1, wherein said at least one FIB portion includes a plurality of FIB portions, the method further comprising:
    ordering the plurality of FIB portions by respective accessibility levels, wherein a FIB portion with greater accessibility is ranked above an FIB portion with lesser accessibility;
    assigning secondary FIB entries at common depth levels to the respective FIB portions, wherein secondary FIB entries at a lower depth level are assigned to FIB portions with higher accessibility rankings.

14. The method of claim 1, further comprising:
    re-ordering a secondary FIB entry in a linked list of FIB entries.

15. The method of claim 14, wherein re-ordering the secondary FIB entry comprises replacing a primary FIB entry with a secondary FIB entry.

16. The method of claim 1, further comprising:
    re-allocating a secondary FIB entry from a current FIB portion corresponding to a first memory channel to a new FIB portion corresponding to a second memory channel.

17. The method of claim 1, wherein each of the first and second FIB entries include:
    a respective pair of source and destination addresses; and
    a respective set of next hop information identifying a next hop to be used when forwarding information received from a source address of a given pair of source and destination addresses to the destination address of the pair.

18. The method of claim 17, wherein the destination addresses include group destination addresses.

19. An article of manufacture, comprising:
    a machine-readable storage medium to provide instructions, which if executed by a processor perform operations including:
    extracting source and destination addresses from a packet;
    determining if a FIB entry corresponding to the source and destination addresses exists;
    accessing a first forwarding information base (FIB) entry of a distributed FIB using a first channel of a multi-channel memory store;

accessing a second FIB entry using a second channel of the multi-channel memory store;

hashing at least one of the source and destination addresses from the packet to locate a primary FIB entry;

locating a secondary FIB entry based on information retrieved from the primary FIB entry;

retrieving next hop information for the packet from the secondary FIB entry; and invoking a missing entry exception if the FIB entry corresponding to the source and destination addresses is determined to not exist.

20. The article of manufacture of claim 19, wherein:

the primary FIB entry comprises a first link in a linked list of FIB entries, the secondary FIB entry comprises a second link in the linked list.

21. The article of manufacture of claim 19, wherein the machine-readable storage medium includes further instructions, which if executed by a processor perform operations including:

determining a depth level of a new FIB entry to be added to a linked list of FIB entries;

identifying an FIB portion of a distributed FIB to which the depth level is assigned; and storing the new FIB entry in the FIB portion that is identified.

22. The article of manufacture of claim 19, wherein the machine-readable storage medium includes further instructions, which if executed by a processor perform operations including:

iteratively traversing FIB entries in a linked list of FIB entries using a first execution thread;

determining if a depth level of a next FIB entry in the linked list exceeds a depth level threshold; and, in response thereto, employing a second execution thread to access the next FIB entry.

23. The article of manufacture of claim 22, wherein the first execution thread is executed by a micro-engine of a network processor and the second execution thread is executed by a general-purpose processor on the network processor.

24. A network apparatus, comprising:

a network processor including a plurality of micro-engines and a media switch fabric interface;

a multi-channel static random access memory (SRAM) store, operatively coupled to the network processor;

a dynamic random access memory (DRAM) store, operatively coupled to the network processor;

media switch fabric, including cross-over connections between a plurality of input/output (I/O) ports via which packets are received at and forwarded from; and a plurality of instructions, accessible to the network processor, which if executed by the network processor perform operations including:

managing a distributed forward information base including respective FIB portions that are accessed via respective channels of the multi-channel SRAM store;

accessing a first forwarding information base (FIB) entry of the distributed FIB using a first channel of the multi-channel SRAM store;

concurrently accessing a second FIB entry using a second channel of the multi-channel SRAM store;

extracting source and destination addresses from a packet;

employing a hash function on the source and destination addresses to locate a primary FIB entry; and retrieving next hop information from a secondary FIB entry located based on information obtained from the primary FIB entry, the next hop information identifying a next hop to which the packet is to be forwarded.

25. The network apparatus of claim 24, wherein the network processor further includes a built-in general-purpose processor.

26. The network apparatus of claim 24, wherein execution of the instructions performs further operations including:

locating the primary FIB entry comprising a first link in a linked list of FIB entries;

retrieving linking information from the primary FIB entry identifying a location of the secondary FIB entry comprising a second link in the linked list; and locating the secondary FIB entry using the linking information.

27. The network apparatus of claim 26, wherein execution of the instructions performs further operations including re-ordering FIB entries in a linked list of FIB entries.

* * * * *